US008939823B2

United States Patent
Kanemaru et al.

(10) Patent No.: US 8,939,823 B2
(45) Date of Patent: Jan. 27, 2015

(54) VEHICLE HVAC SYSTEM WITH RAM PRESSURE CONTROL

(75) Inventors: Junichi Kanemaru, Columbus, OH (US); Shinji Kakizaki, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 408 days.

(21) Appl. No.: 13/031,403

(22) Filed: Feb. 21, 2011

(65) Prior Publication Data

US 2012/0214394 A1    Aug. 23, 2012

(51) Int. Cl.
*B60H 1/00* (2006.01)
*B61D 27/00* (2006.01)
*B63J 2/00* (2006.01)
*B64D 13/00* (2006.01)

(52) U.S. Cl.
CPC ........ *B60H 1/00471* (2013.01); *B60H 1/00849* (2013.01); *B60H 1/00678* (2013.01); *B60H 1/00764* (2013.01); *B60H 2001/00085* (2013.01)
USPC ............................................ 454/139; 454/75

(58) Field of Classification Search
USPC .................................... 454/75, 139
See application file for complete search history.

(56) References Cited

U.S. PATENT DOCUMENTS

| 2,893,700 | A | * | 7/1959 | Boylan et al. ................. 165/272 |
| 4,531,671 | A | * | 7/1985 | Schwenk ................. 237/12.3 B |
| 5,167,574 | A | * | 12/1992 | Ikeda et al. ................... 454/164 |
| 5,645,479 | A | * | 7/1997 | Komowski ..................... 454/139 |
| 5,699,960 | A | * | 12/1997 | Kato et al. ..................... 237/2 A |
| 5,946,923 | A | * | 9/1999 | Samukawa et al. ............. 62/133 |

(Continued)

FOREIGN PATENT DOCUMENTS

DE        19805883        8/1999
FR        2764550        12/1998

(Continued)

OTHER PUBLICATIONS

International Search Report and Written Opinion of PCT/US12/20052 dated Apr. 30, 2012.

(Continued)

*Primary Examiner* — Steven B McAllister
*Assistant Examiner* — Jonathan Cotov
(74) *Attorney, Agent, or Firm* — Rankin, Hill & Clark LLP

(57) ABSTRACT

A blower unit for a vehicle HVAC system, which is operable in one of a fresh air mode, a recirculation air mode and a mixture mode, comprises a housing defining an exterior fresh air intake aperture and an interior recirculation air intake aperture. A suction passage is in communication with both the exterior and interior air intake apertures. A first door is operably associated with the exterior air intake aperture for selectively opening and closing the exterior air intake aperture. A second door operably associated with the interior air intake aperture for selectively opening and closing the interior air intake aperture. The first and second doors are movable independent of each other. A partition is located in the suction passage for at least partially dividing the suction passage. The partition is selectively engaged by at least one of the first and second doors depending on the mode of the HVAC system. In the mixture mode, the first door is configured to control ram pressure as vehicle speed increases to maintain a predetermined airflow ratio between fresh air flowing into the housing via the exterior air intake aperture and recirculation air flowing into the housing via the interior air intake aperture.

15 Claims, 7 Drawing Sheets

(56) References Cited

U.S. PATENT DOCUMENTS

| | | | |
|---|---|---|---|
| 6,110,036 | A | 8/2000 | Queinnec |
| 6,319,112 | B2 | 11/2001 | Komowski |
| 6,367,271 | B2 * | 4/2002 | Forrest et al. ............. 62/186 |
| 6,435,960 | B2 | 8/2002 | Sato |
| 6,958,009 | B2 | 10/2005 | Shindou et al. |
| 8,092,285 | B2 * | 1/2012 | Mathur et al. ............. 454/75 |
| 8,302,674 | B2 * | 11/2012 | Kim et al. ............. 165/202 |
| 2001/0047658 | A1 * | 12/2001 | Forrest et al. ............. 62/186 |
| 2002/0025772 | A1 * | 2/2002 | Egami et al. ............. 454/121 |
| 2005/0075063 | A1 | 4/2005 | Ailloud et al. |
| 2006/0030253 | A1 * | 2/2006 | Asai et al. ............. 454/75 |
| 2006/0086495 | A1 | 4/2006 | Yelles |
| 2007/0095517 | A1 * | 5/2007 | Schall ............. 165/204 |
| 2007/0218824 | A1 * | 9/2007 | Bailey ............. 454/139 |
| 2009/0314847 | A1 * | 12/2009 | Nemoto et al. ............. 237/5 |
| 2010/0144260 | A1 * | 6/2010 | Cho et al. ............. 454/75 |
| 2010/0144261 | A1 * | 6/2010 | Barkic et al. ............. 454/75 |
| 2010/0248608 | A1 * | 9/2010 | Belanger ............. 454/159 |
| 2011/0244776 | A1 * | 10/2011 | Jordan ............. 454/69 |
| 2012/0009859 | A1 * | 1/2012 | Wijaya et al. ............. 454/75 |
| 2012/0077426 | A1 * | 3/2012 | Dage ............. 454/75 |
| 2012/0142264 | A1 * | 6/2012 | Sagou et al. ............. 454/75 |
| 2012/0152512 | A1 * | 6/2012 | Mori ............. 165/202 |

FOREIGN PATENT DOCUMENTS

| | | | | |
|---|---|---|---|---|
| JP | 58167223 | A | * 10/1983 | ............. B60H 3/00 |
| WO | WO 2010063435 | A1 | * 6/2010 | |

OTHER PUBLICATIONS

Extended European Search Report of EP Application No. 12749513. 3, dated Aug. 13, 2014, 4 pages.

* cited by examiner

VEHICLE HVAC SYSTEM WITH RAM PRESSURE CONTROL

BACKGROUND

Exemplary embodiments herein generally relate to vehicle HVAC systems, and, more particularly, relate to a partial recirculation vehicle HVAC system with ram pressure control.

It is known to provide heating, ventilation, and air conditioning (HVAC) systems in vehicles. These systems heat and cool the air within the passenger compartment for the comfort of the vehicle passengers. Some vehicle HVAC systems can be selectively configured to change the source of air. In one configuration, the HVAC system draws in fresh air from outside the vehicle, conditions the air, and then pumps the conditioned air into the passenger compartment. In another configuration, the HVAC system draws in air from inside the passenger compartment, conditions the air, and then recirculates the air into the passenger compartment. In still another configuration, the HVAC system draws in a mixture of exterior air and interior air, conditions the mixed air, and then pumps the conditioned air into the passenger compartment. In the "mixture" configuration, the passengers receive a portion of fresh air, which can reduce window fogging and also make riding in the vehicle more pleasant, and receive a portion of recirculated air, which can increase fuel economy.

Although these known vehicle HVAC systems have worked for their intended purposes, some disadvantages remain. For instance, with these HVAC systems, as vehicle speed increases the ratio between fresh air and recirculation air will change. When the vehicle is traveling at higher rates of speed, the pressure of the exterior air entering the exterior air intake of the HVAC system (i.e., the "ram air" or "ram pressure") is relatively high. The amount of fresh air intake increases and the amount of recirculation air decreases due to the inability of the sucking pressure of the blower unit to overcome an increase in ram air pressure. As a result, the high humidity associated with the fresh air intake can significantly increase compressor load which, in turn, causes fuel economy efficiency to decrease.

BRIEF DESCRIPTION

In accordance with one aspect, a blower unit for a vehicle HVAC system, which is operable in one of a fresh air mode, a recirculation air mode and a mixture mode, comprises a housing defining an exterior fresh air intake aperture and an interior recirculation air intake aperture. A suction passage is in communication with both the exterior and interior air intake apertures. A first door is operably associated with the exterior air intake aperture for selectively opening and closing the exterior air intake aperture. A second door operably associated with the interior air intake aperture for selectively opening and closing the interior air intake aperture. The first and second doors are movable independent of each other. A partition is located in the suction passage for at least partially dividing the suction passage. The partition is selectively engaged by at least one of the first and second doors depending on the mode of the HVAC system. In the mixture mode, the first door is configured to control ram pressure as vehicle speed increases to maintain a predetermined airflow ratio between fresh air flowing into the housing via the exterior air intake aperture and recirculation air flowing into the housing via the interior air intake aperture.

In accordance with another aspect, a blower unit for a vehicle HVAC system, which is operable in one of a fresh air mode, a recirculation air mode and a mixture mode, comprises an exterior air inlet and a recirculation air inlet. A controllable flag-type circulating air valve controls the flow of recirculation air through the recirculation air inlet. A controllable butterfly-type ram air valve controls the flow of exterior air through the exterior air inlet. The circulating air valve and ram air valve are supported for pivotal movement about separate bearing axes such that the ram air valve is controllably movable independently of the circulating air valve to thereby control ram air pressure of air flowing through the exterior air inlet independently of the position of the circulating air valve.

In accordance with yet another aspect, a blower unit for a vehicle HVAC system, which is operable in one of a fresh air mode, a recirculation air mode and a mixture mode, comprises a housing defining an exterior fresh air intake aperture and an interior recirculation air intake aperture. A suction passage is in communication with both the exterior and interior air intake apertures. A butterfly-type first door is disposed in the exterior air intake aperture for selectively opening and closing the exterior air intake aperture. A second door is provided for selectively opening and closing the interior air intake aperture. A partition is located in the suction passage for at least partially dividing the suction passage into a first suction passage and a second suction passage. The partition is selectively engaged by at least one of the first and second doors depending on the mode of the HVAC system. A sensor measures volume of at least fresh air flowing through the exterior air intake aperture. The first and second doors are supported for pivotal movement about separate bearing axes such that the first door is controllably movable independently of the second door to thereby control ram air pressure of air flowing through the exterior air intake aperture independently of the position of the second door to maintain a predetermined airflow ratio between fresh air flowing and recirculation air flowing into the blower.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary blower unit for a vehicle HVAC system disclosed herein are merely terms of art that may vary from one manufacturer to another and should not be deemed to limit the present disclosure.

Figure 1:
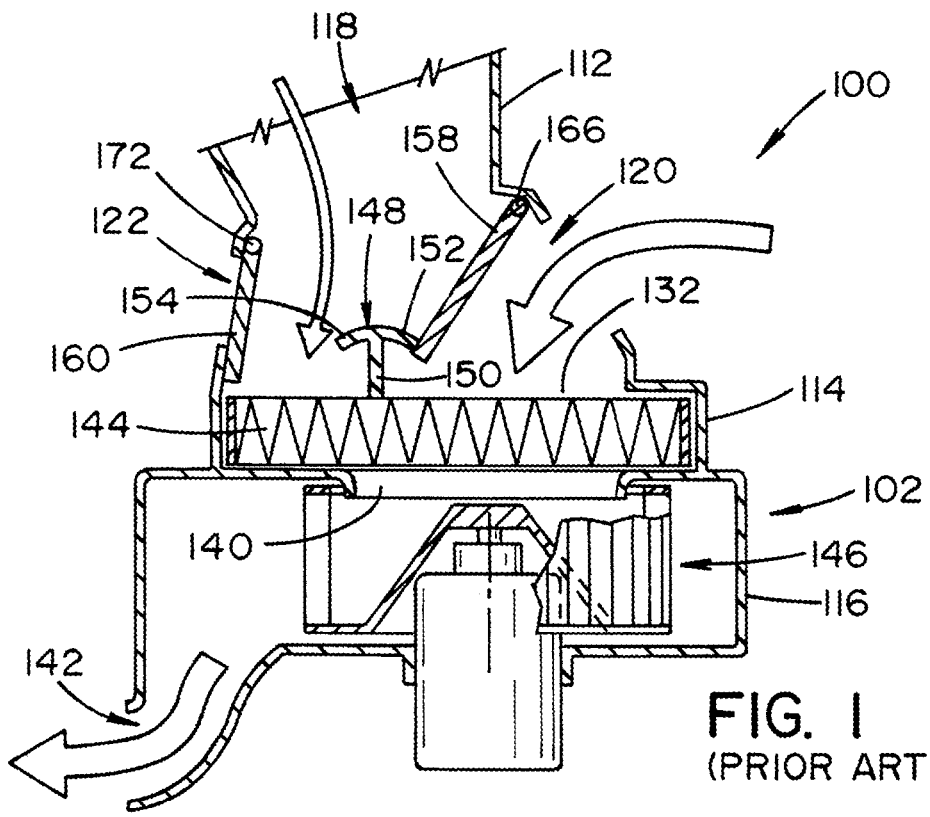
FIGS. 1 and 2 schematically illustrate a blower unit for a known HVAC system for a vehicle, the HVAC system having a mixture operation mode wherein the both fresh air and interior air are drawn into the blower unit.
Figure 2:
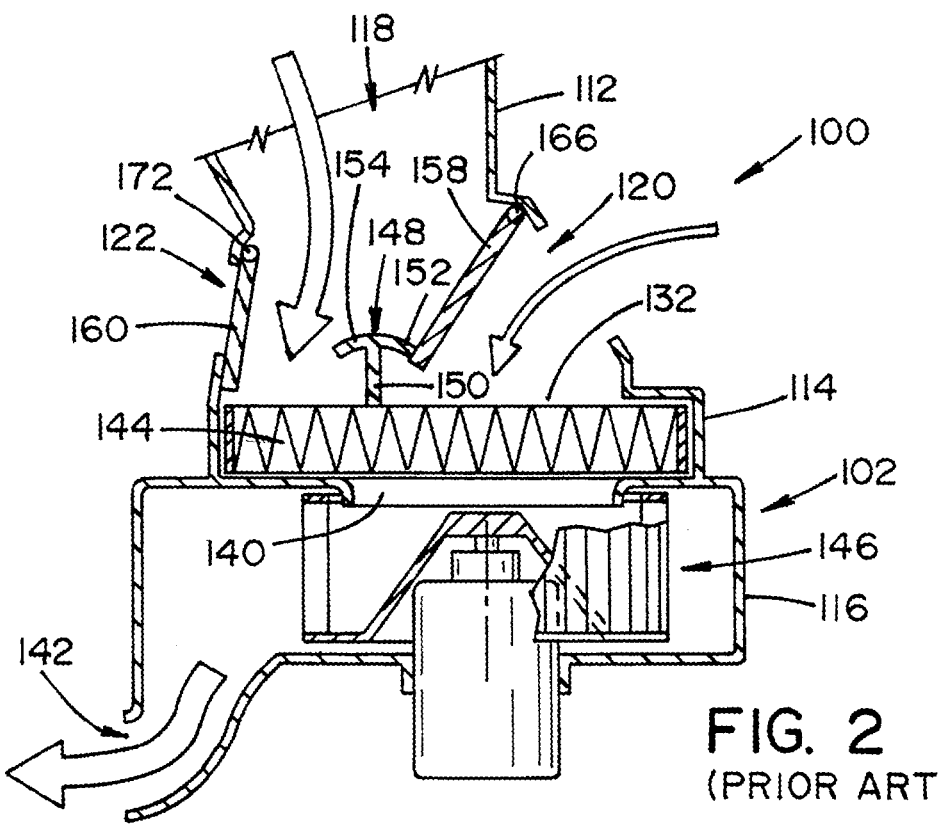

Referring now to the drawings, wherein like numerals refer to like parts throughout the several views, FIGS. 1 and 2 schematically illustrate a known vehicle HVAC system 100 comprising a blower unit 102. The blower unit 102 generally includes an upper case member 112, a bellmouth member 114, and a lower case member 116. The bellmouth member 114 is disposed between and coupled to the upper case member 112 and the lower case member 116.

The upper case member 112 is generally hollow and defines an exterior air intake aperture 118 as shown in FIGS. 1 and 2. The exterior air intake aperture 118 is in fluid communication with the exterior space outside the vehicle, e.g. ambient. The upper case member 112 also defines a first interior air intake aperture 120 and a second interior air intake aperture 122. The interior air intake apertures 120,122 are in fluid communication with the interior space of the passenger compartment of the vehicle. The upper case member 112 further includes a lower opening 132, which is in fluid communication with the bellmouth member 114.

The bellmouth member 114 substantially covers an open top end 140 of the lower case member 116. The lower case member 116 also includes an exhaust port 142. The exhaust port 142 is in fluid communication with a heater unit (not shown) and/or a cooling unit (not shown). The blower unit 102 also includes a filter 144. The filter 144 is supported by the upper case member 112 adjacent the lower opening 132 and substantially covers the lower opening 132. The filter 144 filters out dust and any other particulate from the air as the air passes from the upper case member 112 to the bellmouth member 114.

A fan 146 is disposed within the lower case member 116. The fan 146 is operable to draw air into the blower unit 102 through the exterior air intake aperture 118 and/or the interior air intake apertures 120, 122. That air then moves through the filter 144, and any particulate matter is filtered out. The fan 146 then sucks the air into the lower case member 116, and then the fan 146 pushes the air out the exhaust port 142 toward the heater unit or the cooling unit (not shown). Disposed within the upper case member 112 near the lower opening 132 of the blower unit 102 is a partition or sealing member 148. The sealing member 148 includes a main body portion 150, a first arm 152 and a second arm 154. The first and second arms 152, 154 extend away from the main body 150 downwardly toward the bellmouth member 114.

As shown in FIGS. 1 and 2, the blower unit 102 further includes a first door 158 and a second door 160. The first and second doors 158, 160 are each generally flat and straight (e.g., generally planar). The first door 158 is movably coupled to the upper case member 112 by at least one pin 166, which allows the first door 158 to pivot about the pin 166 between the sealing member 148 and the first interior air intake aperture 120. The second door 160 is similar to the first door 158, and is movably coupled to the upper case member 112 by at least one pin 172. Thus, the second door 160 is able to pivot about the pin 172 between the sealing member 148 and the second interior air intake aperture 122. The first and second door 158, 160 can be actuated about the respective pins 166, 172 in any suitable manner, such as one or more motors.

The first and second doors 158, 160 can be moved between a fresh air position, a recirculating air position, and a mixture position. In the fresh air position (not shown), the first door 158 obstructs the first interior air intake aperture 120 and the second door 160 obstructs the second interior air intake aperture 122. As such, air is able to enter the blower unit 102 through the exterior air intake aperture 118, and air is unlikely to enter the blower unit 102 through the interior air intake aperture 120,122. When the first and second doors 158, 160 are in the recirculating air position (not shown), the first and second doors 158, 160 are sealed against the respective first and second arms 152,154 of the sealing member 148 to thereby cooperate to obstruct the exterior air intake aperture 118. When the first and second doors 158, 160 are in the mixture position (FIGS. 1 and 2), the second door 160 obstructs the second interior air intake aperture 122, and the first door 158 is sealed against the first arm 152 of the sealing member 148. As such, air is able to enter the blower unit 102 through both the exterior air intake aperture 118 and the first interior air intake aperture 120.

Figure 6:
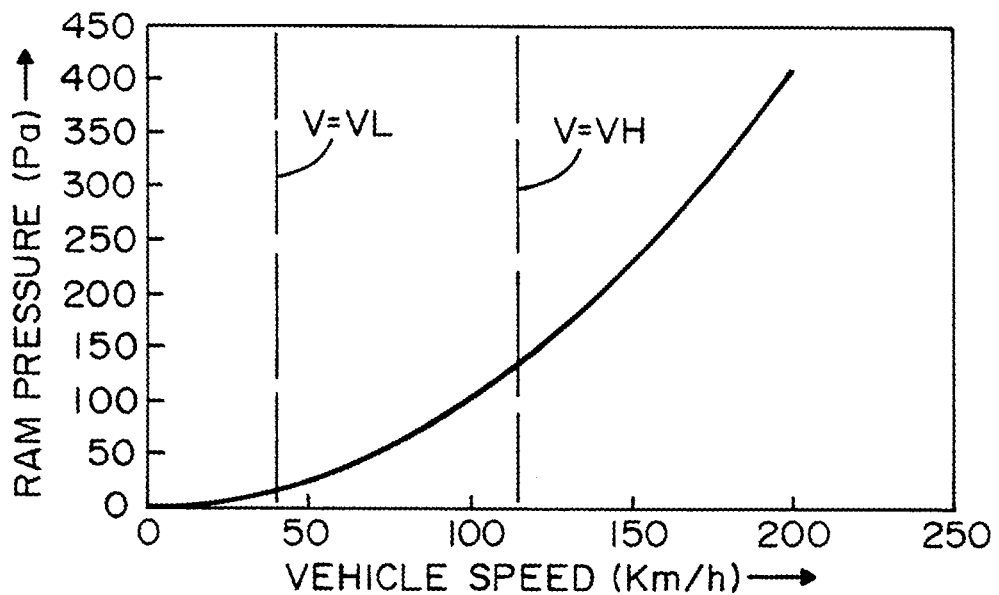
Figure 7:
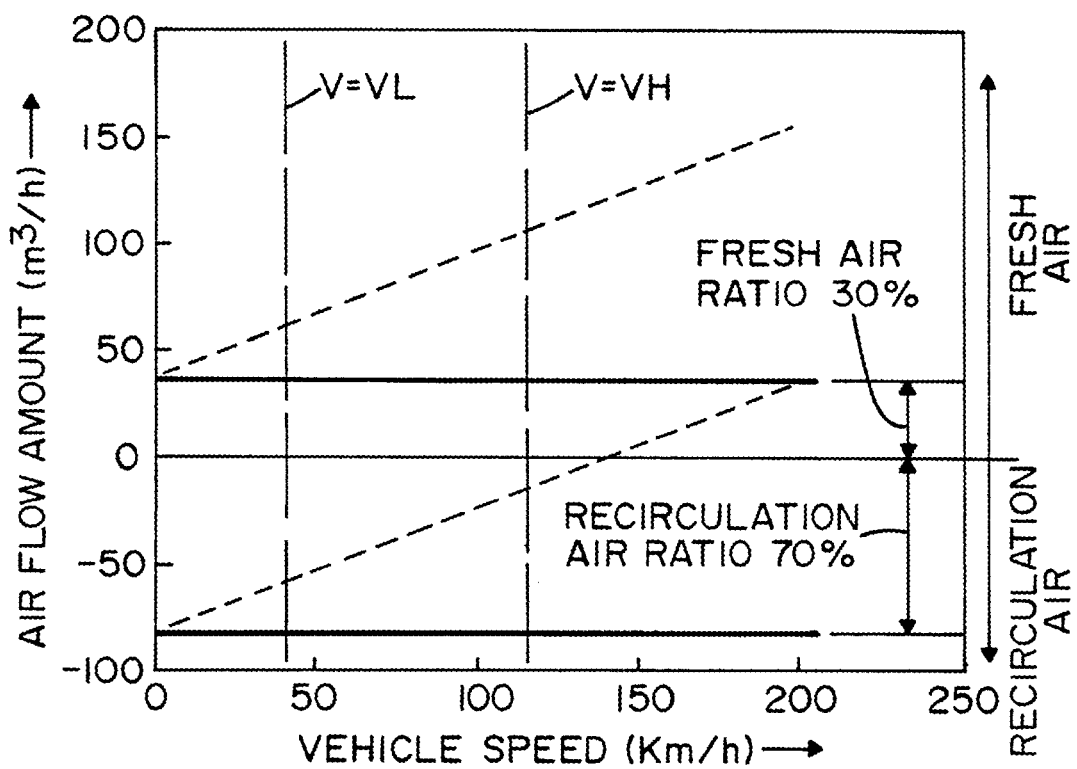
FIG. 7 graphically depicts the ratio of fresh air and interior air in the mixture mode as vehicle speed increases for both the known HVAC system and the HVAC system of the present disclosure.

With the known HVAC system 100, and as graphically illustrated in FIGS. 6 and 7, when the vehicle is traveling at higher rates of speed, the ram pressure of the exterior air entering the blower unit 102 is relatively high. As a result, in the mixture air mode, the ratio between fresh air and recirculation air will change. For example, the HVAC system 100 tries to provide a predetermined ratio between fresh air and recirculation air in the mixture position. This ratio is typically about 30% fresh air and about 70% recirculation air at a vehicle speed of 0 Km/h. However, with the known HVAC system 100, the amount of fresh air intake increases and the amount of recirculation air decreases as the vehicle speed increases due to the inability of the sucking pressure of the blower unit to overcome an increase in ram air pressure (see the dashed lines in FIG. 7). For example, at a vehicle low speed (VL), the ratio is about 50% fresh air and 50% recirculation air. At a vehicle high speed (VH), the ratio is about 90% fresh air and 10% recirculation air. As a result, the high humidity associated with the fresh air intake can significantly increase compressor load which, in turn, causes fuel economy efficiency to decrease.

Figure 3:
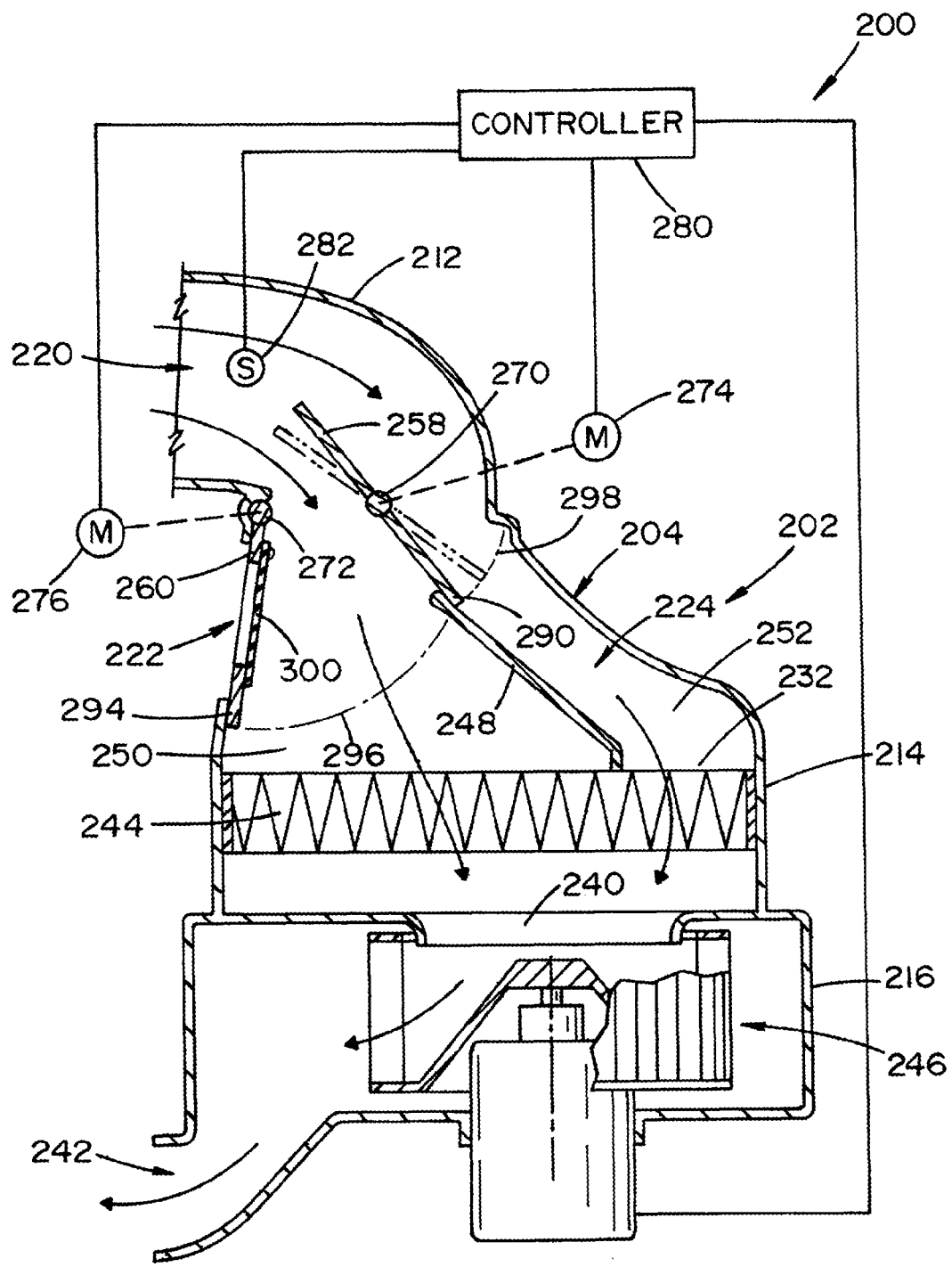
FIG. 3 schematically illustrates a HVAC system according to one aspect of the present disclosure, the HVAC system being in a fresh air operation mode wherein only fresh exterior air is drawn into the blower unit.
Figure 4:
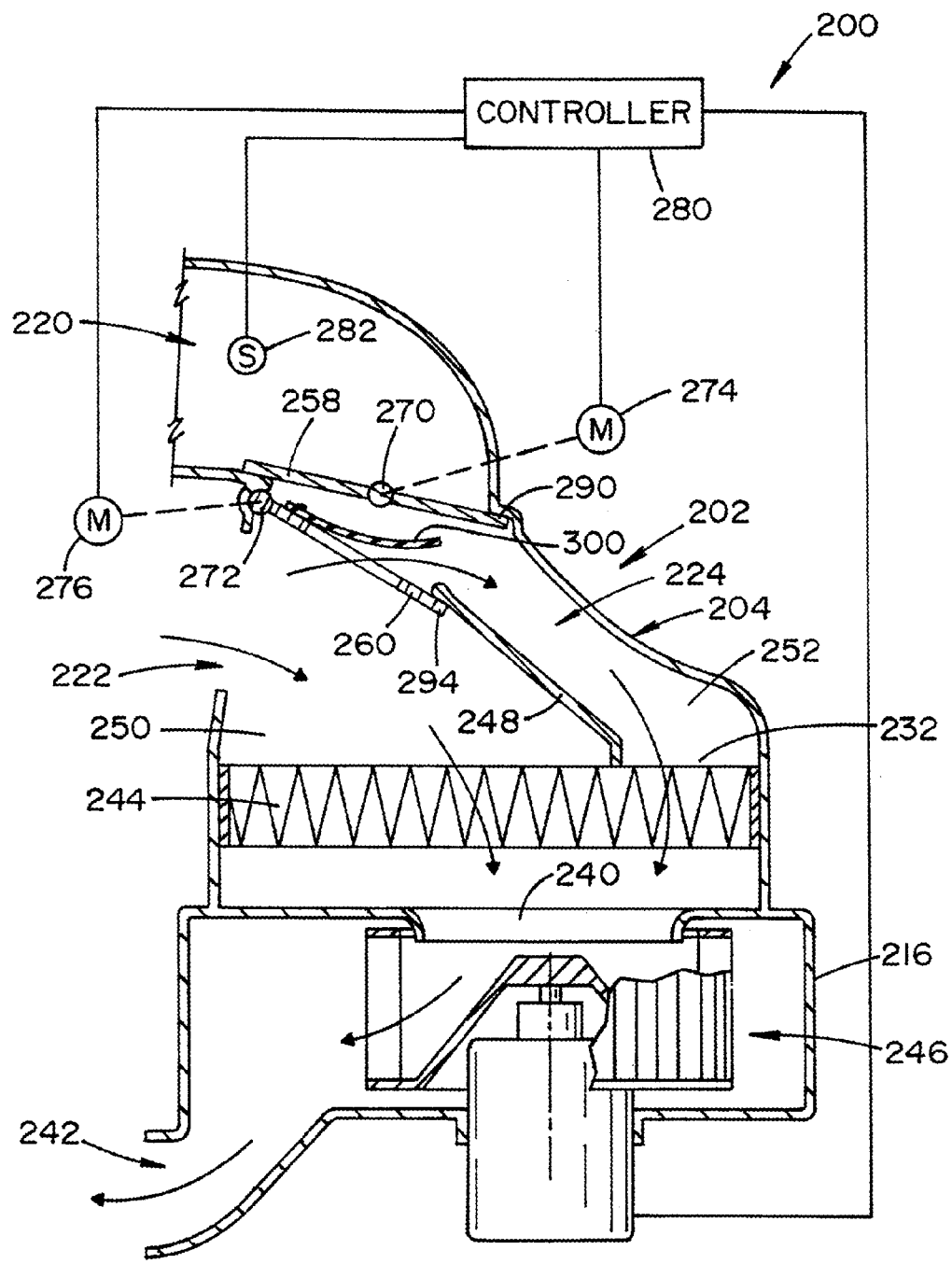
FIG. 4 schematically illustrates the HVAC system of FIG. 3 in a recirculation operation mode wherein only interior air is drawn into the blower unit.
Figure 5:
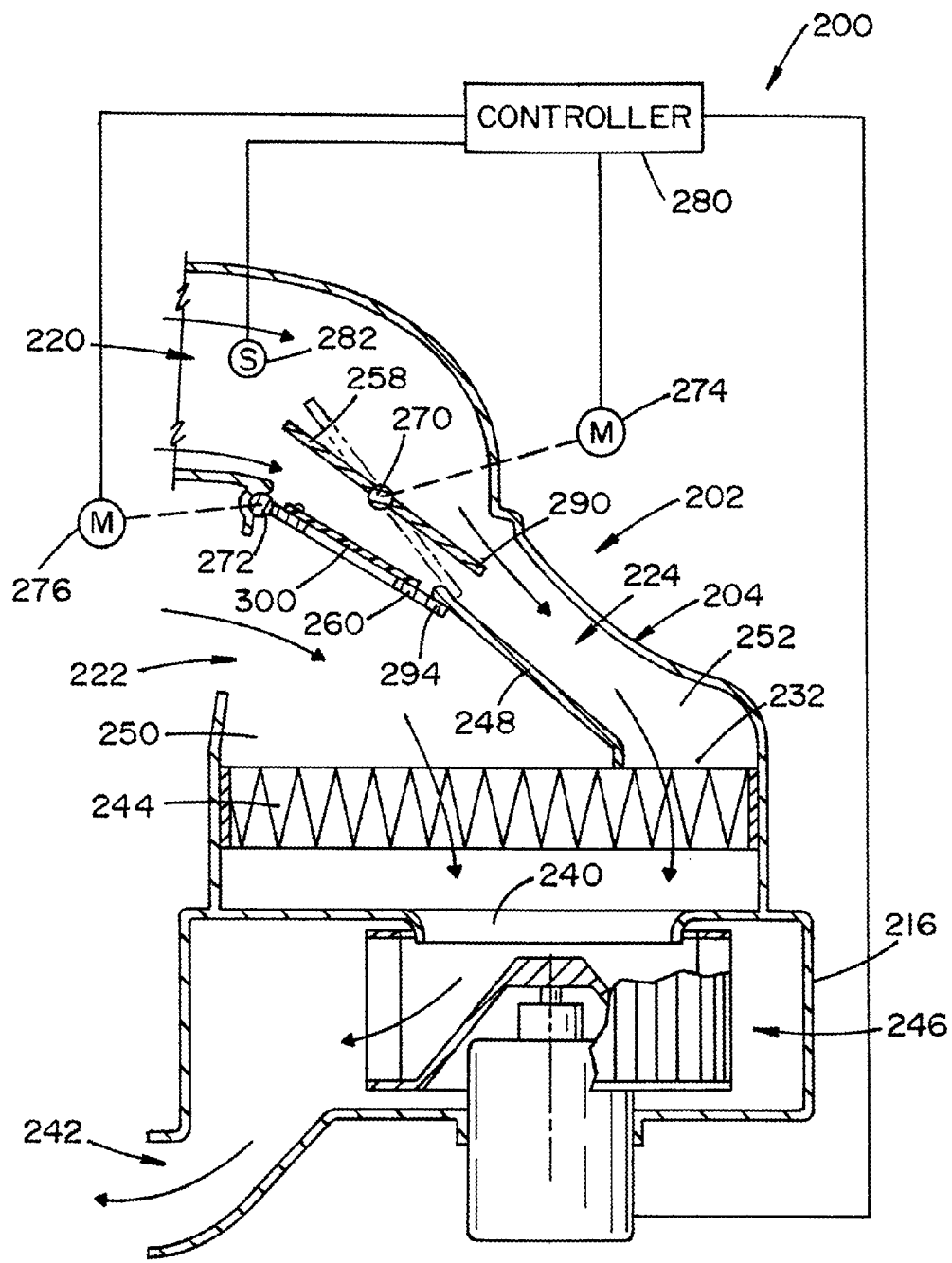
FIG. 5 schematically illustrates the HVAC system of FIG. 3 in a mixture operation mode wherein the both fresh air and interior air are drawn into the blower unit FIG. 6 graphically depicts the increase in ram pressure as vehicle speed increases.

With reference now to FIGS. 3-5, a HVAC system 200 according to one aspect of the present disclosure is illustrated. The HVAC system 200 is operable in one of a fresh air mode (FIG. 3), a recirculation air mode (FIG. 4) and a mixture air mode (FIG. 5). The HVAC system 200 comprises a blower unit 202. The blower unit 202 draws in air from an interior space within the vehicle passenger compartment (not shown) and/or the exterior space outside the passenger compartment (e.g. ambient). The blower unit 202 moves the air into a heater unit (not shown) and/or a cooler unit (not shown) such that the air can be conditioned (i.e., heated and/or cooled). Once the air is heated/cooled, the conditioned air moves into the interior space for the comfort of the passengers.

The blower unit 202 comprises a housing 204. Similar to the known blower unit 102, the housing 204 can be separated into an upper case member 212, a bellmouth member 214, and a lower case member 216. The bellmouth member 214 is disposed between and coupled to the upper case member 212 and the lower case member 216. The upper case member 212, bellmouth member 214 and lower case member 216 can be integrally formed to define a unitary housing 204; although, this is not required. The housing 204, and more particularly, the upper case member 212, defines an exterior fresh air intake aperture or inlet 220 and an interior recirculation air intake aperture or inlet 222. A suction passage 224 is in communication with both the exterior and interior air intake apertures 220,222.

The exterior air intake aperture 220 is in fluid communication with the exterior space outside the vehicle. As such, ambient air is able to enter the blower unit 202 through the exterior air intake aperture 220. The interior air intake aperture 222 is in fluid communication with the interior space of the passenger compartment of the vehicle. As such, air within the interior space is able to enter the blower unit 202 through the interior air intake aperture 222. The upper case member 212 further includes a lower opening 232, which is in fluid communication with the bellmouth member 214. The bellmouth member 214 substantially covers an open top end 240 of the lower case member 216. The lower case member 216 also includes an exhaust port 242. The exhaust port 242 is in fluid communication with a heater unit (not shown) and/or a cooling unit (not shown). As such, air within the blower unit 202 can exit the blower unit through the exhaust port 242 to be conditioned. The blower unit 202 also includes a filter 244, which is supported by the upper case member 212 adjacent the lower opening 232 and substantially covers the lower opening 232. Dust and any other particulate matter is filtered out of the air by the filter 244 as the air passes from the upper case member 212 to the bellmouth member 214.

A fan 246 is disposed within the lower case member 216, and is operable to draw air into the blower unit 202 through the exterior air intake aperture 220 and/or the interior air intake aperture 222. Next, the air moves through the lower opening 232 of the upper case member 212 and then through the bellmouth member 214. That air then moves through the filter 244, and any particulate matter is filtered out. The fan 246 then sucks the air into the lower case member 216, and then the fan 246 pushes the air out the exhaust port 242 toward the heater unit or the cooling unit (not shown). Disposed within the housing 202 upstream from the exhaust port 242, the fan 246 and the filter 244 is a partition 248. The partition 248 is located in the suction passage 224 for at least partially dividing the suction passage into a first suction passage 250 and a second suction passage 252.

As shown in FIGS. 3-5, the blower unit 202 further includes a controllable first door or ram air valve 258 disposed to control the flow of exterior air from the exterior air inlet 220 toward the blower 246 and the exhaust outlet 242, and a controllable second door or circulating air valve 260 disposed to control the flow of recirculation air through the recirculation air inlet 222 toward the blower 246 and the exhaust outlet 242. The first door 258 is operably associated with the exterior air intake aperture 220 for selectively opening and closing the exterior air intake aperture. The second door 260 is operably associated with the interior air intake aperture 222 for selectively opening and closing the interior air intake aperture. The first and second doors 258,260 are movable independent of each other and can selectively engage the partition 248 depending on the mode of the HVAC system 200. As will be described in greater detail below, in the mixture mode, the first door 258 is configured to control ram pressure as vehicle speed increases to maintain a predetermined airflow ratio between fresh air flowing into the housing 204 via the exterior air intake aperture 220 and recirculation air flowing into the housing 204 via the interior air intake aperture 222.

In the depicted exemplary embodiment, the first and second doors 258,260 are supported for pivotal movement about separate axes. More particularly, the first door 258 is a butterfly type door having a central portion movably coupled to the upper case member 212 of the housing 204 by at least one pivot pin 270. The pivot pin 270 is positioned in the exterior air intake aperture 220, which allows the first door 258 to pivot or rotate in the suction passage 224 between contact with the partition 248 and contact with the housing 204 to block or seal air from flowing through the exterior air intake aperture 220 towards the suction passage 224. The second door 260 is a flag-type door having one of its end portions movably coupled to the upper case member 212 by at least one pin 272. Thus, the second door 260 is able to pivot about the pin 272 between contact with the partition 248 and contact with the housing 204 blocking or sealing the interior air intake aperture 222. With the configuration of the first and second doors 258,260, and as shown in FIG. 3, movement of a distal end 294 of the second door 260 defines an arc 296, and movement of the a distal end 290 of the first door defines an arc 298. The distal end 290 of the first door 258 travels along the arc 298 between a closed position where the first door 258 closes the exterior air intake aperture 220 from communication with the suction passage 224 and a fully open position where the first door engages the partition 248.

As indicated previously, the first door 258 is controllably movable independent of the second door 260. To this end, the first and second door 258, 260 can be actuated about the respective pins 270, 272 in any suitable manner, such as one or more actuators or motors. As shown, motor 274 is operably connected to the first door 258 and motor 276 is operably connected to the second door 260. A controller 280 is provided for controlling operation of each of the motors 274,276 and the fan 246. At least one sensor 282 for measuring ram air pressure and/or volume of fresh air flowing through the exterior air intake aperture 220 and/or volume of recirculation air flowing through the interior air intake aperture 222 can be provided in the blower unit 202. The at least one sensor 282 can be positioned in the housing 204, for example in the exterior air intake aperture 220 and/or the interior air intake aperture 222 and/or suction passage 224. The at least one sensor 282 is in signal communication with the controller 280, and based at least partially on the output of the at least one sensor 282, rotational position of the first door 258 can be selectively adjusted to control ram pressure (i.e., the rotational position of the first door 258 can be at least partially dependent on the measured value(s)). Thus, the use of the at least one sensor 282 can enable high precision in the positioning of the ram pressure adjusting first door 258 in the mixture air operation mode.

Figure 8:
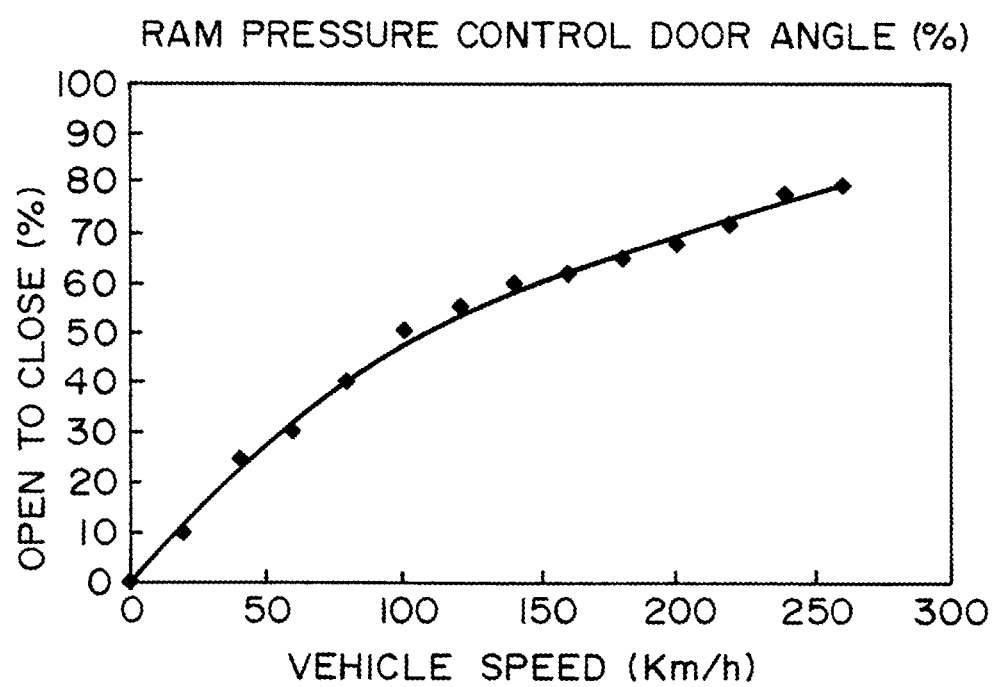
FIG. 8 graphically depicts ram pressure control door angle percent based on vehicle speed.

Another manner for controlling the rotational position of the ram pressure adjusting first door 258 to obtain a target fresh air amount (for example, about 30% fresh air, see FIG. 7) for a vehicle is a ram pressure control map, which is graphically depicted in FIG. 8. The control map can be created by first tracking ram pressure as a function of vehicle speed (see FIG. 6). The graph of FIG. 6 can be obtained by driving the vehicle, maintaining the first door 258 in a fully opened position, and monitoring the ram pressure as vehicle speed increases. Next, based on the vehicle speed test results of FIG. 6, specific ram pressures for specific vehicle speeds are acquired by adjusting power to the fan 246. Then, for each specific ram pressure and speed, the rotational position of the first door 258 is incrementally changed from a fully open position (0% first door angle) to a closed position (100% first door angle), and the amount of fresh air at each increment is determined. Based on the fresh air amount by ram pressure, an opening angle of the first door 258 to obtain the target fresh air amount for each vehicle speed can be determined and the control map of FIG. 8 can be created. With this control map, and based on the vehicle speed, the controller 280 can control the rotational position of the first door 258 to control ram pressure.

The first and second doors 258, 260 can be moved between a fresh air position, a recirculating air position, and a mixture position. As shown in FIG. 3, in the fresh air position (i.e., in the fresh air mode of the HVAC system 200), the butterfly-type first door 258 rotates to allow airflow into the blower unit 202 through the exterior air intake aperture 220, and the second door 260 obstructs the interior air intake aperture 222. The first door 258 selectively moves between a partial open position, a fully open position where the distal end 290 of the first door 258 engages the partition 248, and a closed position, which is where the first and second suction passage 250,252 are blocked, to control ram pressure. As such, air is able to enter the blower unit 202 through the exterior air intake aperture 220 and flow through the suction passage 224 on either side of the partition 248, through the filter 244, through the bellmouth member 214, through the lower case member 216, and out of the blower unit 202 through the exhaust port 242. In this manner, the exterior air introduced into the interior of the vehicle will be fresh, and thus enjoyable for passenger breathing comfort.

With reference to FIG. 4, in the recirculating air position (i.e., in the recirculating air mode of the HVAC system 200), the first door 258 obstructs the exterior air intake aperture 220 and the flag-type second door 260 is moved to a fully open position where the end 294 of the second door engages the partition 248. When the first and second doors 258, 260 are in the recirculating air position, air is able to enter the blower unit 202 through the interior air intake aperture 222, flow through the filter 244, through the bellmouth 214 and lower case member 216, and out of the blower unit 202 through the exhaust port 242. It will appreciated that when the first and second doors 258, 260 are in the recirculating air position, the HVAC system 200 can operate more efficiently to thereby conserve fuel.

Figure 9:
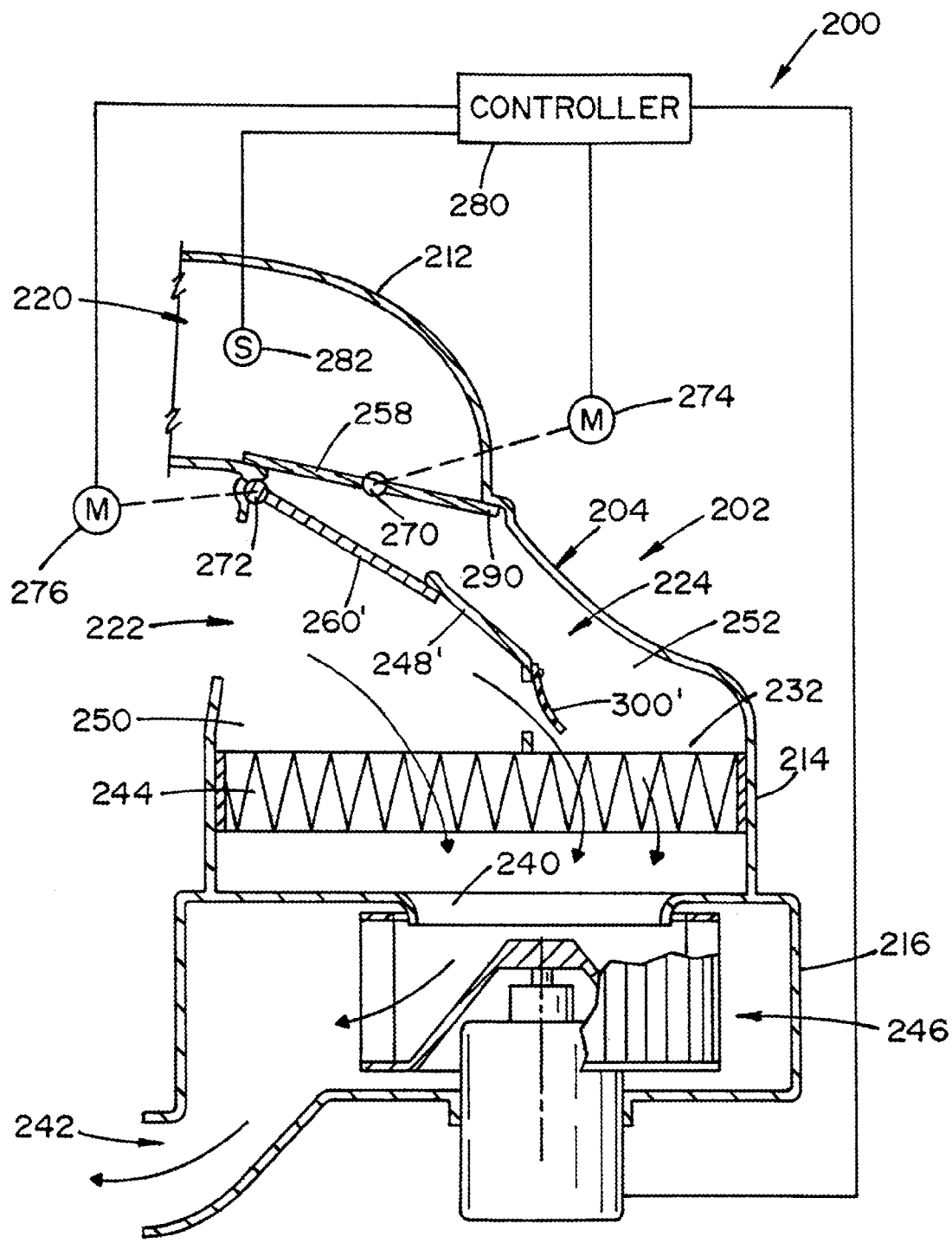
FIG. 9 schematically illustrates a HVAC system according to another aspect of the present disclosure, the HVAC system being in a recirculation operation mode wherein only interior air is drawn into the blower unit.

In the illustrated exemplary embodiment, in the recalculating air mode, interior air flows through the suction passage 224 on either side of the partition 248. To allow the interior air to flow through the entire suction passage 224, and according to one aspect, a one-way valve or door 300 is provided. According to one aspect, the second door 260 includes the one-way valve 300. The one-way valve 300 allows the recirculation air to flow through the second door 260 and into the portion 252 of the suction passage 224 separated from fluid communication with the interior air intake aperture 222 by the partition 248 and the second door 260 in its fully open position. As shown in FIG. 9, and according to another aspect, the partition 248' includes the one-way valve 300'. With this configuration, the one-way valve 300' allows the recirculation air to flow through the partition 248' and into that portion 252 of the suction passage 224 which is separated from fluid communication with the interior air intake aperture 222 by the partition 248' and the second door 260' in its fully open position.

With reference to FIG. 5, in the mixture air position (i.e., in the mixture mode of the HVAC system 200 which allows airflow into the blower unit 202 through both the exterior and interior air intake apertures 220,222), the first door 258 is movable between the partial open position and the fully open position, and the second door 260 is moved to a fully open position where the end 294 of the second door 260 engages the partition 248. The butterfly-type first door 258 is installed in the exterior air intake aperture 220 and is configured to control the ram pressure and shut off the flow of fresh air through the exterior air intake aperture 220 toward the first and second suction passages 250,252. The first door 258 selectively engages the partition 248 positioned within the suction passage 224 to maintain specific airflow ratios between fresh and recirculation air. When the first and second doors 258, 260 are in the mixture position, air is able to enter the blower unit 202 through both the exterior air intake aperture 220 and the interior air intake aperture 222. The ram pressure associated with the flow of exterior air is applied against the one-way valve 300 thereby preventing the one-way valve 300 from opening. Similarly, as shown in FIG. 3, in the fresh air mode the ram pressure associated with the flow of exterior air is applied against the one-way valve 300 from opening. With reference back to FIG. 5, the interior air flow through the first suction passage 250 and the exterior air flows through the second suction passage 252. The mixture air flows through the filter 244, through the bellmouth member 214, through the lower case member 216, and out of the blower unit 202 through the exhaust port 242.

As indicated previously, the first and second doors 258, are supported for pivotal movement about the separate axes defined by the pins 270,272 such that the first door 258 is controllably movable independently of the second door 260 to thereby control ram air pressure of air flowing through the exterior air intake aperture 220 independently of the position of the second door 260. With the rotational position of the first door 258 being dependent on vehicle speed, the blower unit 202 can maintain a predetermined airflow ratio between fresh air flowing into the blower unit via the exterior air intake aperture 220 and recirculation air flowing into the blower unit via the recirculation air intake aperture 222. Particularly, and with reference to FIGS. 6 and 7, when the vehicle is traveling at higher rates of speed, the ram pressure of the exterior air entering the blower unit 202 is relatively high. With the HVAC system 200 described above, by controlling ram pressure, an increase in the amount of fresh air intake can be prevented and the balance between fresh air and recirculation air (about 30% fresh air and about 70% recirculation air, see solid lines of FIG. 7) in the mixture position can be maintained as the speed of the vehicle increases. Controlled displacement of the pressure adjusting first door 258 enables the dynamic pressure at the exterior air intake aperture 220 to be held substantially constant regardless of the flow velocity of the air at the exterior air intake aperture, since this velocity is a function of the speed of forward travel of the vehicle and of the ambient wind speed. Thus, the HVAC system 200 can maintain constant airflow ratios of fresh air/recirculation air regardless of rise of ram pressure based on vehicle speed, which can reduce the impact to fuel economy efficiency.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A blower unit for a vehicle HVAC system which is operable in one of a fresh air mode, a recirculation air mode and a mixture mode, the blower unit comprising:

a housing defining an exterior fresh air intake aperture, an interior recirculation air intake aperture and a suction passage in communication with both the exterior and interior air intake apertures;

a first door operably associated with the exterior air intake aperture for selectively opening and closing the exterior air intake aperture;

a second door operably associated with the interior air intake aperture for selectively opening and closing the interior air intake aperture, the first and second doors being movable independent of each other;

a partition located in the suction passage for at least partially dividing the suction passage into a first suction passage and a second suction passage, the partition having a proximal end portion and a distal end portion, the proximal end portion of the partition being selectively engaged by the first and second doors in their respective fully open position depending on the mode of the HVAC system;

wherein in the mixture mode, the first door is configured to control ram pressure as vehicle speed increases to maintain a predetermined airflow ratio between fresh air flowing into the housing via the exterior air intake aperture and recirculation air flowing into the housing via the interior air intake aperture;

wherein in the fresh air mode, the first door rotates to an open position to allow airflow into the blower unit through the exterior air intake aperture and the second door obstructs the interior air intake aperture, the first door selectively moving between a partial open position and the fully open position and a closed position where the first and second suction passages are blocked to control ram pressure; and wherein in the recirculation air mode, the first door rotates to the closed position to obstruct the exterior air intake aperture and the second door is moved to an open position, and when the second door is in the fully open position recirculation air flows through the first and second passages.

2. The blower unit of claim 1, wherein the first door is a butterfly-type door.

3. The blower unit of claim 1, wherein the first door is pivotally mounted such that the first door can rotate in the suction passage.

4. The blower unit of claim 1, wherein the first door is moveably coupled to the housing via a pivot pin, the pivot pin being positioned in the exterior air intake aperture.

5. The blower unit of claim 1, wherein in the mixture mode of the HVAC system which allows airflow into the blower unit through both the exterior and interior air intake apertures, the first door is movable between the partial open position and the fully open position where fresh air flows through the second passage, and the second door is moved to the fully open position where an end of the second door engages the proximal end portion of the partition and where recirculation air flows through the first passage.

6. The blower unit of claim 1, wherein in the recirculation air mode of the HVAC system, the first door obstructs the exterior air intake aperture and the second door is moved to the fully open position where an end of the second door engages the proximal end portion of the partition.

7. The blower unit of claim 6, wherein the second door is a flag-type door having a one-way valve, the one-way valve allowing the recirculation air to flow through the second door and into the second passage separated from fluid communication with the interior air intake aperture by the partition when the second door is in the fully open position.

8. The blower unit of claim 6, wherein the partition includes a one-way valve, the one-way valve allowing the recirculation air to flow through the partition and into the second message passage portion separated from fluid communication with the interior air intake aperture by the partition when the second door is in the fully open position.

9. The blower unit of claim 1, further comprising at least one sensor positioned in the housing for measuring volume of air flowing through the suction passage from the exterior air intake aperture and from the interior air intake aperture, a rotational position of the first door being at least partially dependent on values measured by the sensor.

10. The blower unit of claim 1, wherein the first door is a butterfly-type door and the second door is a flag-type door, the first and second doors are supported to the housing for pivotal movement about separate bearing axes, a distal end of the first door traveling between a closed position where the first door closes the exterior air intake aperture and a fully open position where the first door engages the proximal end portion of the partition.

11. The blower unit of claim 1, wherein the predetermined airflow ratio between fresh air flowing through the exterior air intake aperture and recirculation air flowing through the interior air intake aperture is about 30% fresh air and about 70% recirculation air, and a rotational position of the first door at various vehicle speeds to maintain the predetermined airflow ratio is determined by a ram pressure control map, the control map being at least partially based on selected target fresh air amounts for specific ram pressures at specific vehicle speeds.

12. A blower unit for a vehicle HVAC system which is operable in one of a fresh air mode, a recirculation air mode and a mixture mode, the blower unit comprising:

an exterior air inlet;

a recirculation air inlet;

a controllable flag-type circulating air valve configured to control the flow of recirculation air through the recirculation air inlet;

a controllable butterfly-type ram air valve configured to control the flow of exterior air through the exterior air inlet, wherein the circulating air valve and ram air valve are supported for pivotal movement about separate bearing axes such that the ram air valve is controllably movable independently of the circulating air valve to thereby control ram air pressure of air flowing through the exterior air inlet independently of the position of the circulating air valve; and wherein the blower unit defines a suction passage in fluid communication with both the exterior air inlet and the recirculation air inlet, and further including a partition including a proximal end portion and a distal end portion, the partition at least partially separating the suction passage into a first suction passage and a second suction passage;

wherein in the fresh air mode of the HVAC system, the ram air valve rotates to an open position and the circulating air valve closes the recirculation air inlet, the ram air valve selectively moving between a partial open position and a fully open position where the ram air valve engages the proximal end portion of the partition and a closed position where the first and second suction passages are blocked by the ram air valve to control ram pressure;

wherein in the mixture mode of the HVAC system, the ram air valve is movable between the partial open position and the fully open position where fresh air flows through the second passage, and the circulating air valve is moved to a fully open position where the circulating air valve engages the proximal end portion of the partition and where recirculation air flows through the first passage, the rotational position of the ram air door being dependent on vehicle speed to maintain a predetermined airflow ratio between fresh air flowing into the blower unit via the exterior air inlet and recirculation air flowing into the blower unit via the recirculation air inlet; and wherein in the recirculation mode of the HVAC system, the ram air valve moves to the closed position and closes the exterior air intake and the circulating air valve moves to an open position, and when the circulating air valve is in the fully open position the recirculation air flowing through the recirculation air inlet flows through the first and second passages.

13. The blower unit of claim 12, further including at least one sensor for measuring ram air pressure.

14. The blower unit of claim 12, wherein the circulating air valve includes a separate a one-way valve, wherein in the recirculation mode of the HVAC system, the circulating valve engages the proximal end portion of the partition, the recirculation air flowing through the recirculation air inlet being directed through the first suction passage, wherein the one-way valve allows the recirculation air to flow through the circulating air valve and into the second air passage.

15. The blower unit of claim 12, wherein the partition includes a one-way valve, wherein in the recirculation mode of the HVAC system, the circulating valve engages the proximal end portion of the partition, the recirculation air flowing through the recirculation air inlet being directed through the first suction passage, wherein the one-way valve allows the recirculation air to flow through the partition and into the second air passage.

\* \* \* \* \*

UNITED STATES PATENT AND TRADEMARK OFFICE
CERTIFICATE OF CORRECTION

PATENT NO. : 8,939,823 B2
APPLICATION NO. : 13/031403
DATED : January 27, 2015
INVENTOR(S) : Kanemaru et al.

It is certified that error appears in the above-identified patent and that said Letters Patent is hereby corrected as shown below:

In the Claims

Col. 9, Line 61 Claim 8, delete "message" and "portion".

Signed and Sealed this
Nineteenth Day of May, 2015

Michelle K. Lee
*Director of the United States Patent and Trademark Office*